(12) United States Patent
Petrovic et al.

(10) Patent No.: US 6,399,698 B1
(45) Date of Patent: Jun. 4, 2002

(54) PROCESS FOR THE SYNTHESIS OF EPOXIDIZED NATURAL OIL-BASED ISOCYANATE PREPOLYMERS FOR APPLICATION IN POLYURETHANES

(75) Inventors: Zoran S. Petrovic; Ivan J. Javni, both of Pittsburg, KS (US)

(73) Assignee: Pittsburg State University, Pittsburg, KS (US)

( * ) Notice: Subject to any disclaimer, the term of this patent is extended or adjusted under 35 U.S.C. 154(b) by 0 days.

(21) Appl. No.: 09/699,095

(22) Filed: Oct. 26, 2000

(51) Int. Cl.$^7$ ................................................ C08L 75/04

(52) U.S. Cl. .......................... 524/590; 528/44; 528/48; 528/57; 528/55; 524/589; 549/512

(58) Field of Search ............................... 528/44, 48, 57, 528/55; 524/589, 590; 549/512

(56) References Cited

U.S. PATENT DOCUMENTS

| | | | | |
|---|---|---|---|---|
| 4,658,007 A | 4/1987 | Marks et al. | .................. | 528/55 |
| 4,699,931 A | 10/1987 | Fuzesi et al. | ................ | 521/117 |
| 5,126,423 A | 6/1992 | Iwamoto | ...................... | 528/45 |
| 5,138,016 A | 8/1992 | Murdock et al. | .............. | 528/55 |
| 5,817,860 A | 10/1998 | Rizk et al. | ..................... | 560/25 |
| 5,968,995 A | 10/1999 | Rizk et al. | ................... | 521/159 |
| 6,277,943 B1 * | 8/2001 | Sarpeshkar et al. | | |

* cited by examiner

*Primary Examiner*—Robert Dawson
*Assistant Examiner*—Kuo-Liang Peng
(74) *Attorney, Agent, or Firm*—Head, Johnson & Kachigian

(57) ABSTRACT

An isocyanate prepolymer for application in polyurethanes. The prepolymer is synthesized by combining epoxidized natural oils with isocyanates and a catalyst. The prepolymer contains oxazolidone rings that will react with polyols to form polyurethane. The invention provides a method of using a renewable resource in a fast, simple process to produce substantial amounts of isocyanate prepolymer and a minimum of homopolymers.

12 Claims, No Drawings

PROCESS FOR THE SYNTHESIS OF EPOXIDIZED NATURAL OIL-BASED ISOCYANATE PREPOLYMERS FOR APPLICATION IN POLYURETHANES

BACKGROUND OF THE INVENTION

1. Field of the Invention.

The present invention relates to a method of synthesizing isocyanate prepolymers for use in polyurethane synthesis. More particularly, the invention relates to the synthesis of isocyanate prepolymers from epoxidized natural oils and polyisocyanates.

2. Prior Art.

Polyurethanes comprise a wide variety of polymers. They are, in fact, the most ubiquituous polymer in the chemical industry today. Polyurethanes are defined as any polymer formed by linking isocyanic groups to hydroxyl groups present on different monomers. The polymer-forming hydroxyl and isocyanic groups can be attached to an endless variety of monomers, making the varieties of polyurethanes equally endless. Polyisocyanates and polyhydroxyl compounds may also be used to increase crosslinking in polyurethanes. Not surprisingly, uses for polyurethanes are almost as endless as their varieties. Polyurethane is used for adhesives, sealants, coatings and elastomers. The multiple uses and varieties of polyurethanes are well known in the art.

Isocyanates readily react with water, and are severe eye and skin irritants. When inhaled, they can be toxic to humans. A significant amount of isocyanate vapor is released during the synthesis of polyurethane. This poses a significant danger to humans. In order to decrease the risk of harm to persons working with polyurethanes, it has become well known in the art to use a safer isocyanate compound, known as a prepolymer, in the polyurethane polymerization reaction. Prepolymers are formed by reacting isocyanates or polyisocyanates with another compound such as a diol or an epoxide. The resulting prepolymer binds to the isocyanate and prevents the release of harmful vapors during the polymerization reaction. This safer prepolymer is then used to form polyurethane.

Epoxides are readily available, and their use in formation of prepolymers is well known in the art. When isocyanates are reacted with epoxides, prepolymers containing oxazolidone rings are formed. These oxazolidone rings not only prevent evaporation of the isocyanates, but also provide favorable thermal qualities to the resulting polyurethane. Oxazolidones may also be polymerized themselves, forming oxazolidone polymers or even oxizolidone/polyurethane combination polymers. These combinations provide for even greater variety and versatility of polyurethane chemistry. They are also well known in the art.

Reactions between monoepoxides and monoisocyanates are fairly straight forward. The reactants are heated in the presence of a catalyst, and the reaction runs to completion. However, the reactions between polyepoxides and polyisocyanates are much more complex. These reactions produce a variety of by-products that are deleterious to the final polymer. Polyisocyanates form trimers known as isocyanurates. These trimers increase the viscosity of the prepolymer and contribute to brittleness of the final product. Homopolymerization of polyepoxides results in polyethers that also reduce the quality of the final product. In addition, both of these reactions compete with the favorable oxazolidone forming reaction. The quantity of oxazolidones produced can be increased by modifying the reaction temperature and using specific catalysts. It is known in the art that various catalysts, such as halide compounds, organometal compounds, quaternary ammonia salts and organoantimony iodine, may be used to encourage the desired reaction and inhibit the formation of isocyanurate and polyethers.

The majority of epoxides used to form isocyanate prepolymers are synthetic, often derived from petrochemicals. These compounds are generally harmful to both the environment and those handling them. Safety has always been a major concern in the chemical industry. In recent years environmental concerns have also been addressed by the industry. There is an active trend toward using renewable, natural resources. This benefits the environment, and can sometimes be less expensive than using synthetic components. Natural oils, derived from plants and animals, exist in great abundance. They are readily available, inexpensive and very renewable. In addition they are easily epoxidized to form polyepoxides. As these oils are abundant, natural and renewable, it is desirable to use their epoxides in the formation of isocyanate prepolymers. Unfortunately, natural oils tend to contain ester groups. These ester groups may, under certain conditions, be hydrolyzed, decomposed or transesterified. This leads to a plethora of functional groups. When reacted with isocyanates, these additional functional groups interfere with the formation of the desired product, oxazolidones. They also cause side reactions that lead to the formation of a variety of undesirable by-products. Therefore, epoxidized natural oils have been considered poor epoxides for the formation of isocyanate prepolymers.

It is therefore desirable to develop a process whereby natural oil epoxides may by used to form isocyanate prepolymers.

It is also desirable to develop a fast, simple process for forming stable isocyanate prepolymers having a long shelf life.

It is also desirable to provide a new method for making sealants by using epoxidized natural oil based isocyanate prepolymers as the raw material.

It is also desirable to provide a new method for making coatings by using epoxidized natural oil based isocyanate prepolymers as the raw material.

It is also desirable to provide a new method for making adhesives by using epoxidized natural oil based isocyanate prepolymers as the raw material.

It is also desirable to provide a new method for making elastomers by using epoxidized natural oil based isocyanate prepolymers as the raw material.

SUMMARY OF THE INVENTION

The method of the present invention involves converting epoxidized natural plant or animal oils to isocyanate prepolymers by reaction with polyisocyanates. The reaction product comprises a mixture of chemicals including oxazolidones, urethanes, amides, urea, isocyanurates, uretdiones and esters. Oxazolidone is the dominant product of the reaction. This method takes place at atmospheric pressure.

The process of the present invention comprises mixing an epoxidized natural oil in solution with isocyanate and a catalytic amount of a Lewis acid so as to form a natural oil-based isocyanate prepolymer. An organic solvent, isocyanate and a Lewis acid are poured into a reaction vessel. The content is stirred and heated to 150–160° C. The epoxidized natural oil is then added. The reaction temperature is increased up to the boiling point of the solvent and maintained at that temperature until the completion of the reaction. The progress of the reaction may be monitored by titration. The reaction is finished when the isocyanate concentration drops to about half of the starting concentration. The reaction generally takes anywhere from 10 to 180 minutes.

Any epoxidized natural or animal oil may be used in this process. Oils extracted from vegetables, flowers, seeds and animals are all suitable for use in the present invention. These oils are both renewable and inexpensive. They are also readily commercially available in epoxidized form. The iodine values of these natural oils range from about 40 to 220 and more preferably from about 80 to 180.

Any polyisocyanate may be used. Some polyisocyanates react more quickly and/or at lower temperatures than others. This is generally due to the geometric configuration of the molecule itself. The presence of conjugated rings, aliphatic groups and steric hindrances will all affect the reactivity of an individual isocyanate. The isocyanate chosen will depend not only on its reactivity, but the use to which the prepolymer and resulting polyurethane will be put.

The catalyst may be an organometal compound, a Lewis acid or a halide compound. Preferably, aluminum trichloride is the catalyst used. Aluminum trichloride provides for a shorter reaction time. The natural oil-based prepolymer is also produced more consistently, and has a lower viscosity and longer stability when aluminum chloride is used.

The solvent should have a relatively high boiling point, preferably between 140 to 200° C. The solvent can not have any hydrogen donor functional groups. Appropriate solvents will also not react with isocyanate or epoxidized oil at elevated temperatures.

Natural oils contain fatty ester chains. Epoxy groups located on these chains tend to be less reactive. Therefore, higher reaction temperatures are usually required when using natural oils having fatty ester chains. Additional time may also be required to complete reactions with these natural oils.

The prepolymers formed are characterized by the presence of one or more oxazolidone rings. The oxazolidone rings formed will react with compounds having hydroxyl groups to form polyurethane. It is often desirable to increase the amount of crosslinking by using a polyol.

The prepolymers formed by the present invention may further be reacted with polyols to form polyurethanes. By using different polyols, polyurethanes having different qualities are produced. The present invention further provides methods for producing distinct polyurethanes, each developed for a particular purpose. Specifically, polyurethanes are provided that are suitable coatings, sealants, adhesives and elastomers. These polyurethanes provide suitable alternatives to ones derived from synthetic epoxides. Such compositions are highly desirable because they utilize renewable, inexpensive base materials. It may also prove beneficial in some applications to form oxazolidone polymers or a oxazolidone/polyurethane combination polymers.

It is therefore an object of the present invention to provide a process for synthesizing isocyanate prepolymers from epoxidized natural oils.

It is a further object of the present invention to provide a fast simple process for forming stable isocyanate prepolymers having a long shelf life.

It is a further object of the present invention to provide a new method for making sealants by using epoxidized natural oil based isocyanate prepolymers as the raw material.

It is another object of the present invention to provide a new method for making coatings by using epoxidized natural oil based isocyanate prepolymers as the raw material.

It is a further object of the present invention to provide a new method for making adhesives by using epoxidized natural oil based isocyanate prepolymers as the raw material.

It is a further object of the present invention to provide a new method for making elastomers by using epoxidized natural oil based isocyanate prepolymers as the raw material.

DETAILED DESCRIPTION OF THE PREFERRED EMBODIMENTS

The method of the present invention involves converting epoxidized natural plant or animal oils to isocyanate prepolymer by reaction with polyisocyanates. The reaction product comprises a mixture of chemicals including oxazolidones, urethanes, amides, urea, isocyanurate, uretdiones and esters. Oxazolidones are the dominant product of the reaction. This method takes place at atmospheric pressure.

The process of the present invention comprises mixing an epoxidized natural oil in solution with isocyanate and a catalytic amount of a Lewis acid so as to form a natural oil-based isocyanate prepolymer. An organic solvent, an isocyanate and a Lewis acid are poured into a reaction vessel. The contents are stirred and heated to 150–160° C. The epoxidized natural oil is then added. The reaction temperature is increased up to the boiling point of the solvent and maintained there until the reaction is complete. The progress of the reaction may be monitored by titration. A sample of the reaction is removed and titrated for isocyanate content. On a larger scale, other methods of measuring isocyanate concentration may prove more practical or efficient. The reaction is finished when the isocyanate concentration drops to about half of the starting concentration. Depending on the use the prepolymer is put to, it may be desirable to extract and purify the oxazolidone product from the reaction mixture.

Any epoxidized natural plant or animal oil may be used in this process. Examples of natural oils that may be used include, but are not limited to, soybean oil, safflower oil, linseed oil, corn oil, sunflower oil, olive oil, canola oil, sesame oil, cottonseed oil, palm oil, rapeseed oil, tung oil, and fish oil. Any partially hydrogenated and epoxidized natural or genetically modified natural oil can be used in this process. These oils include, but are not limited to, high oleic safflower oil, natural oil, peanut oil, sunflower oil (NuSun sunflower oil) and high erucic rapeseed oil (Crumbe oil). Fish oil among animal oils can be also used. The iodine values of these natural oils range from about 40 to 220 and more preferably from about 80 to 180.

Examples of isocyanates that may be used in the prepolymerization reaction include, but are not limited to aromatic isocyanates such as 4,4'-diphenylmethane diisocyanate (MDI), any polymeric MDI such as PAPI (a product of the Dow Chemicals Company), Isonate (also a product of the Dow Chemicals Company), Mondur (a product of the Bayer Company) or other brand names polymeric MDI isocyanates, any MDI based prepolymer, 2,4:2,6-toluene diisocyanate as an 80:20 or 65:35 mixture, pure 2,4-toluene diisocyanate, pure 2,6-toluene diisocyanate, any TDI-based prepolymer, p-phenylene diisocyanate, 1,5-naphthalene diisocyanate, 4,6-xylylene diisocyanate, 3,3'-tolidine-4,4'-diisocyanate, 3,3'-dimethyl-diphenylmethane 4,4'-diisocyanate, aliphatic isocyantes such as 1,6-hexamethylene diisocyanate, or 2,2,4-(2,4,4-)trimethylhexamethylene diisocyanate, cycloalipahtic isocynates such as 4,4'-dicyclohexylmethane diisocyanate, isophorone diisocynate or cyclohexyl diisocynate, or any isocyanate prepolymer. The isocyanate used in any particular prepolymer will be dictated by its reactivity, the use it is to be put to (coating, sealant, adhesive, elastomer, etc.) and other factors known to those skilled in the art.

The catalysts used in the present invention may be organometal compounds such as triethyl aluminum, triisopropyl aluminum, triphenylantymone iodide, or Lewis acids such as aluminum trichloride, zinc iodide and lithium chloride. The most preferable is aluminum trichloride. Use of aluminum trichloride as the catalyst shortens the reaction time and produces a natural oil-based prepolymer that has a lower viscosity and longer stability. Use of aluminum trichloride also discourages the formation of isocyanurate and other unwanted by-products. The catalytic amount of aluminum trichloride is used in this reaction, which should be below 0.5% by weight of the complete reaction mixture, or 1.5% by weight of the amount of epoxidized oil used.

The solvents used in the present invention are organic solvents having boiling points in the temperature range of 140 to 200° C. The solvents must not have any hydrogen donating functional groups and must not be reactive toward isocyanate or epoxidized oil. Exemplary solvents include xylene and 2-ethoxyethyl acetate. However, any other non-reactive solvent capable of substantially dissolving the reactive compounds (isocyanates and epoxidized oils) is sufficient. In the following exemplary embodiments, solvents were used at a concentration between 0–30% of the total reaction mixture, preferably 10–20%. However, other suitable solvents may provide an adequate reaction solution when present in a substantially greater or lesser concentration.

The reaction time is in a range between 10 to 180 minutes and depends on used isocyanate. Aromatic isocyanates are more reactive and reaction time is between 30–60 minutes. Aliphatic, cycloaliphatric and sterically hindered isocyanates require longer reaction time, up to 180 minutes. The reaction is sustained until the isocyanate concentration has dropped by about 50%.

The location of the oxirane groups on the epoxidized natural oils may affect the speed and efficiency of the reaction. Epoxy groups located in the middle of fatty ester chains found in some natural oils have relatively low reactivity. These oils may require more vigorous reaction conditions, such as higher temperature, to push the reaction equilibrium toward the oxazolidone product.

Once the prepolymers are formed, they may be used in the formation of various polyurethanes. This invention provides for the use of these polyurethanes as coatings, sealants, adhesives and elastomers. However, this invention may also be used to form polyurethanes for other purposes. The invention further anticipates the use of the described prepolymers to form oxazolidone polymers or oxazolidone/polyurethane polymer combinations. Once the prepolymer synthesis reaction is complete, it may be desirable to extract and purify the oxazolidones from the reaction mixture. For some uses, however, it may be desirable to use the reaction mixture itself in polyurethane synthesis. Polyurethane foams may be formed by retaining the unreacted isocyanates. This isocyanate may react with water during polyurethane synthesis, forming a gas and creating bubbles. This results in polyurethane foam. Depending on the isocyanates and polyols used, these foams may be sturdy or flexible, and of varying strength and density.

The following are exemplary embodiments of the present invention.

EXAMPLE 1

An epoxidized soybean oil prepolymer was created from epoxidized natural soybean oil and 4,4'-diphenylmethane diisocyanate (MDI). The epoxidized oil was "Flexol" from Union Carbide. The epoxide content was 7.1%, the iodine number was 1.0, the acid number was 0.2, having a hydroxyl value of 5, viscosity 188 cST at 100° F., specific gravity 0.992 and platinum-cobalt color 61.

| Chemical | Amount | Function |
|---|---|---|
| xylene | 100 ml | solvent |
| MDI | 250 g | isocyanate |
| Flexol | 232 g | epoxide |
| AlCl$_3$ | 1.6 g | catalyst |

100 ml of xylene, 250 g of 4,4'-diphenylmethane diisocyanate (MDI) and 1.6 g of AlCl$_3$ as the catalyst were poured into a 1000 ml three-neck round bottom flask. The contents were stirred with a magnetic bar. 232 grams of epoxidized soybean oil was then added. The reaction temperature was increased to 205° C. (the boiling point of the reaction mixture) and maintained there until the end of the reaction. The reaction was stopped after 60 minutes. The isocyanate content was 12% and viscosity 10.7 Pa.s. The obtained prepolymer was clear brown liquid with good shelf stability.

EXAMPLE 2

An epoxidized soybean oil prepolymer was created from epoxidized natural oil and 4,4'-diphenylmethane diisocyanate pure (MDI). The epoxidized vegetable oil was "Flexol" from Union Carbide.

| Chemical | Amount | Function |
|---|---|---|
| 2-ethoxyethyl Acetate | 100 ml | solvent |
| MDI | 250 g | isocyanate |
| Flexol | 232 g | epoxide |
| AlCl$_3$ | 1.6 g | catalyst |

100 ml of 2-ethoxyethyl acetate, 250 g of 4,4'-diphenylmethane diisocyanate pure (MDI) and 1.6 g of AlCl$_3$ as the catalyst were poured into a 1000 ml three-neck round bottom flask. The contents were stirred with a magnetic bar. 232 g of epoxidized soybean oil was then added. The reaction temperature was increased to 205° C. (the boiling point of the reaction mixture) and maintained there until the end of the reaction. The reaction was stopped after 60 minutes. The isocyanate content was 11.6% and viscosity 15.7 Pa.s. The obtained prepolymer was clear brown liquid with good shelf stability.

EXAMPLE 3

An epoxidized soybean oil prepolymer was created from epoxidized natural oil and 4,4'-diphenylmethane diisocyanate pure (MDI). The epoxidized vegetable oil was "Flexol" from Union Carbide.

| Chemical | Amount | Function |
|---|---|---|
| 2-ethoxyethyl Acetate | 100 ml | solvent |
| MDI | 250 g | isocyanate |

-continued

| Chemical | Amount | Function |
| --- | --- | --- |
| Flexol | 232 g | epoxide |
| LiCl | 3.2 g | catalyst |

100 ml of 2-ethoxyethyl acetate, 250 g of 4,4'-diphenylmethane diisocyanate pure (MDI) and 3.2 g of LiCl as the catalyst were poured into a 1000 ml three-neck bottom round flask. The contents were stirred with a magnetic bar. 232 gm of epoxidized soybean oil was then added. The reaction temperature was increased to 205° C. (the boiling point of the reaction mixture) and maintained there until the end of the reaction. The reaction was stopped after 60 minutes. The isocyanate content was 10.5% and viscosity 12.5 Pa.s. The obtained prepolymer was clear brown liquid.

EXAMPLE 4

An epoxidized soybean oil prepolymer from epoxidized natural oil and polymeric 4,4'-diphenylmethane diisocyanate, PAPI 2901 (a product of the Dow Chemical Company) was created. The epoxidized vegetable oil was "Flexol" from Union Carbide.

| Chemical | Amount | Function |
| --- | --- | --- |
| 2-ethyoxyethyl Acetate | 100 ml | solvent |
| PAPI 2901 | 270 g | isocyanate |
| Flexol | 232 g | epoxide |
| AlCl$_3$ | 1.6 g | catalyst |

100 ml of 2-ethoxyethyl acetate, 270 g of polymeric 4,4'-diphenylmethane diisocyanate PAPI 2901 (a product of the Dow Chemical Company) and 1.6 g of AiCl$_3$ as the catalyst were poured into a 1000 ml three-neck bottom round flask. The contents were stirred with a magnetic bar. 232 g of epoxidized soybean oil was then added. The reaction temperature was increased to 205° C. (the boiling point of the reaction mixture) and maintained there until the end of the reaction. The reaction was stopped after 60 minutes. The isocyanate content was 14.1% and viscosity 9.7 Pa.s. The obtained prepolymer was clear brown liquid with good shelf stability.

EXAMPLE 5

An epoxidized soybean oil prepolymer from epoxidized natural oil and polymeric 4,4'-diphenylmethane diisocyanate Mondur 448 (a product of the Bayer company) was created. The epoxidized vegetable oil was "Flexol" from Union Carbide.

| Chemical | Amount | Function |
| --- | --- | --- |
| 2-ethyoxyethyl Acetate | 100 ml | solvent |
| Mondur 448 | 304 g | isocyanate |
| Flexol | 232 g | epoxide |
| AlCl$_3$ | 1.6 g | catalyst |

100 ml of 2-ethoxyethyl acetate, 304 g of polymeric 4,4'-diphenylmethane diisocyanate Mondur 448 (a product of the Bayer company) and 1.6 g of AlCl$_3$ as the catalyst were poured into a 1000 ml three-neck bottom round flask. The contents were stirred with a magnetic bar. 232 g of epoxidized soybean oil was then added. The reaction temperature was increased to 205° C. (the boiling point of the reaction mixture) and maintained there until the end of the reaction. The reaction was stopped after 60 minutes. The isocyanate content was 13.7% and viscosity 8.7 Pa.s. The obtained prepolymer was clear brown liquid with good shelf stability.

EXAMPLE 6

An epoxidized soybean oil prepolymer from epoxidized natural oil and polymeric Isonate 2143L (a product of the Dow Chemical company) was created. The epoxidized vegetable oil was "Flexol" from Union Carbide.

| Chemical | Amount | Function |
| --- | --- | --- |
| 2-ethoxyethyl Acetate | 100 ml | solvent |
| Isonate 2143L | 290 g | isocyanate |
| Flexol | 232 g | epoxide |
| AlCl$_3$ | 1.6 g | catalyst |

100 ml of 2-ethoxyethyl acetate, 290 g of Isonate 2143L (product of the Dow Chemical company) and 1.6 g of AlCl$_3$ as the catalyst were poured into a 1000 ml three-neck bottom round flask. The contents were stirred with a magnetic bar and than 232 g of epoxidized soybean oil was added. The reaction temperature was increased to 205° C. (the boiling point of the reaction mixture) and maintained there until the end of the reaction. The reaction was stopped after 60 minutes. The isocyanate content was 11.9% and viscosity 13.2 Pa.s. The obtained prepolymer was clear brown liquid with good shelf stability.

EXAMPLE 7

A coating based on epoxidized soybean oil prepolymer from Example 5, and a soybean oil based polyol as a crosslinker was created.

| Chemical | Amount |
| --- | --- |
| prepolymer | 50 g |
| Soypolyol 206 | 27 g |
| acetone | 25 g |
| TiO$_2$ | 1–10 g |
| Irganox 1010 | 0.2–1 wt. % |

50 g of prepolymer was mixed with 27 g of Soypolyol 206 and 25 g of mixture of acetone solvent, 1–10 g of titanium dioxide pigment, and 0.2–1% of Irganox, an antioxidant and UV stabilizer, and applied on aluminum and steel test plates. Any effective antioxidant and UV stabilizer may be used. Acetone was found to be the most suitable solvent for this reaction. However, those skilled in the art will appreciate that other solvents are also suitable.

The samples were cured at room temperature and after one week they were tested. The samples showed adhesion on steel of 100% and aluminum 85%, according to ASTM D3359-95a. Hardness and scratch resistance according to ASTM D3363-92, were 5H and 4H and they were equal on both steel and aluminum substrates. Elasticity according to ASTM D522-93a showed no cracking.

EXAMPLE 8

A coating based epoxidized soybean oil prepolymer from Example 5, and soybean oil based polyol as a crosslinker was created.

| Chemical | Amount |
| --- | --- |
| prepolymer | 50 g |
| Soypolyol 180 | 31 g |
| acetone | 25 g |
| $TiO_2$ | 1–10 g |
| Irganox 1010 | 0.2–1 wt. % |

50 g of prepolymer was mixed with 31 g of Soypolyol 180 and 25 g of mixture of acetone, 1–10 g of titanium dioxide pigment, and 0.2–1% of Irganox 1010, or any other effective antioxidant and UV stabilizer, and applied on aluminum and steel test plates. The samples were cured at room temperature and after one week they were tested. The samples showed adhesion on steel of 100% and on aluminum of 84%, according to ASTM D3359-95a. Hardness and scratch resistance according to ASTM D3363-92, were 3H and HB on steel and 3H and 2H on aluminum. Elasticity according to ASTM D522-93a showed no cracking.

EXAMPLE 9

A coating based on epoxidized soybean oil prepolymer from Example 5, and soybean oil based polyol as a crosslinker was created.

| Chemical | Amount |
| --- | --- |
| prepolymer | 50 g |
| Soypolyol 160 | 35 g |
| acetone | 25 g |
| $TiO_2$ | 1–10 g |
| Irganox 1010 | 0.2–1 wt. % |

50 g of prepolymer was mixed with 35 g of Soypolyol 160 and 25 g of mixture of acetone, 1–10 g of titanium dioxide pigment, and 0.2–1% of Irganox 1010 and applied on aluminum and steel test plates. The samples were cured at room temperature and after one week they were tested. The samples showed adhesion on steel of 100% and on aluminum of 82%, according to ASTM D3359-95a. Hardness and scratch resistance according to ASTM D3363-92, were 2H and H on steel and F and HB on aluminum. Elasticity according to ASTM D522-93a showed no cracking.

EXAMPLE 10

A coating based on epoxidized soybean oil prepolymer, from Example 1, and an amine crosslinker was created.

| Chemical | Amount |
| --- | --- |
| prepolymer | 50 g |
| Versalink P-250 | 22 g |
| acetone | 25 g |
| $TiO_2$ | 1–10 g |
| Irganox 1010 | 0.2–1 wt. % |

50 g of prepolymer was mixed with 22 g of amine based crosslinker Versalink P-250, 25 g of a mixture of acetone, 1–10 g of titanium dioxide pigment, and 0.2–1% of Irganox 1010 and applied on aluminum and steel test plates. The samples were cured at room temperature and after one week they were tested. The sample showed adhesion on steel of 100% and on aluminum of 84%, according to ASTM D3359-95a. Hardness and scratch resistance according to ASTM D3363-92, were 2B and HB on steel and 2B and HB on aluminum. Elasticity according to ASTM D522-93a showed no cracking.

Versalink P-250 was the crosslinker found most suitable in this reaction. However, any amine based crosslinker used in polyurethane formation will suitable. Those skilled in the art will appreciate that a wide variety of amine crosslinkers are suitable in this reaction.

EXAMPLE 11

A sealant based on epoxidized soybean oil prepolymer from Example 5 and a soybean oil based crosslinker was created.

| Chemical | Amount |
| --- | --- |
| prepolymer | 20 g |
| Soypolyol 180 | 11 g |
| $CaCo_4$ | 50 g |

20 g of prepolymer and 11 g of soybean oil based polyol Soypolyol 180, were mixed with 50 g of the calcium carbonate filler and cured over night. The sealant was applied on a steel surface. The sealant was tested according to ASTM C 961-87 and showed a lap-shear strength of 1.3 Mpa. T-peel strength according to ASTM C 906-90 was 3.9 N/mm. Adhesion-in-peel according to ASTM C 794-93 was 2.0 N/mm.

EXAMPLE 12

A sealant based on epoxidized soybean oil prepolymer from Example 5 and a polypropylene oxide crosslinker was created.

| Chemical | Amount |
| --- | --- |
| prepolymer | 20 g |
| polypropylene oxide triol | 35.2 g |
| $CaCo_4$ | 50 g |
| $AlCl_3$ | 0.2 g |

20 g of prepolymer and 35.2 g of polypropylene oxide triol of molecular weight of 1500, were mixed with 50 g of the calcium carbonate filler and 0.2 g of catalyst and cured over night. The sealant was applied on a steel surface. The sealant was tested according to ASTM C 961-87 and showed a lap-shear strength of 0.2 Mpa. T-peel strength according to ASTM C 906-90 was 1.1 N/mm. Adhesion-in-peel according to ASTM C 794-93 was 1.6 N/mm.

EXAMPLE 13

An adhesive based on epoxidized soybean oil prepolymer from Example 5 and glycerin as a crosslinker was created.

| Chemical | Amount |
| --- | --- |
| prepolymer | 10 g |
| glycerin | 0.55 g |

10 g of prepolymer and 0.55 g of glycerin were mixed together, applied on a steel surface and cured over night. The adhesive was tested according to ASTM D 3163-92 and showed a lap-shear strength of 2.3 Mpa. T-peel strength according to ASTM D 1876-93 was 1.4 N/mm. Adhesion-in-peel according to ASTM C 794-93 was 1.9 N/mm.

EXAMPLE 14

An adhesive based on epoxidized soybean oil prepolymer from Example 5 and 1,4-butandiol as a crosslinker was created.

| Chemical | Amount |
| --- | --- |
| prepolymer | 10 g |
| 1,4-butandiol | 0.8 g |

10 g of prepolymer and 0.8 g of 1,4-butandiol were mixed together, applied on a steel surface and cured over night. The adhesive was tested according to ASTM D 3163-92 and showed a lap-shear strength of 2.3 Mpa. T-peel strength according to ASTM D 1876-93 was 3.0 N/mm. Adhesion-in-peel according to ASTM C 794-93 was 2.1 N/mm.

EXAMPLE 15

An adhesive based on epoxidized soybean oil prepolymer from Example 5 and humidity from air as a crosslinker was created.

| Chemical | Amount |
| --- | --- |
| prepolymer | 10 g |
| Soypolyol 180 | 0.05 g |

10 g of prepolymer 0.05 g of amine catalyst were mixed together, applied on a steel surface and cured over night. The adhesive was tested according to ASTM D 3163-92 and showed a lap-shear strength of 2.4 Mpa. T-peel strength according to ASTM D 1876-93 was 0.7 N/mm. Adhesion-in-peel according to ASTM C 794-93 was 0.4 N/mm.

EXAMPLE 16

An adhesive based on epoxidized soybean oil prepolymer from Example 5 and a soypolyol crosslinker was created.

| Chemical | Amount |
| --- | --- |
| prepolymer | 10 g |
| Soypolyol 206 | 4.8 g |

10 g of prepolymer and 4.8 g of polyol Soypolyol 206 were mixed together, applied on a steel surface and cured over night. The adhesive was tested according to ASTM D 3163-92 and showed a lap-shear strength of 2.4 Mpa. T-peel strength according to ASTM D 1876-93 was 0.7 N/mm. Adhesion-in-peel according to ASTM C 794-93 was 0.4 N/mm.

EXAMPLE 17

A cast elastomer based on epoxidized soybean oil prepolymer from Example 4 and a polyol crosslinker was created.

| Chemical | Amount |
| --- | --- |
| prepolymer | 15 g |
| Thanol SF 265 | 2.3 g |

15 g of prepolymer and 2.3 g of triol Thanol SF 265 (Eastman's product) of molecular weight 265 were mixed together, poured in a mold and cured over night over night at room temperature. The cast elastomer showed tensile strength of 11 Mpa and 21% elongation at break.

Whereas, the present invention has been described in relation to the drawings attached hereto, it should be understood that other and further modifications, apart from those shown or suggested herein, may be made within the spirit and scope of this invention.

What is claimed is:

1. A process for forming isocyanate prepolymers from isocyanates and epoxidized natural oils comprising the steps of:
   (A) mixing an organic solvent, an isocyanate and a catalyst in a reaction chamber;
   (B) heating the mixture from step A to the boiling point of said solvent;
   (C) addition of an epoxidized natural oil to the mixture from step B; and,
   (D) continued mixing of the reaction mixture from step C and maintaining the elevated temperature of said reaction mixture until the concentration of said isocyanate drops to about half of its original value.

2. A process for forming isocyanate prepolymers according to claim 1 wherein said organic solvent has a boiling point between 150° and 160° C.

3. A process for forming isocyanate prepolymers according to claim 1 wherein said organic solvent comprises 30% or less of the total weight of said reaction mixture.

4. A process for forming isocyanate prepolymers according to claim 1 wherein said organic solvent comprises 10–20% of the total weight of said reaction mixture.

5. A process for forming isocyanate prepolymers according to claim 1 wherein said organic solvent is xylene.

6. A process for forming isocyanate prepolymers according to claim 1 wherein said organic solvent is 2-ethoxyethyl acetate.

7. A process for forming isocyanate prepolymers according to claim 1 wherein said catalyst is selected from the group consisting of organometal compounds, Lewis acids and quaternary ammonia salts.

8. A process for forming isocyanate prepolymers according to claim 7 wherein said catalyst is Aluminum Chloride.

9. A process for forming isocyanate prepolymers according to claim 7 wherein said catalyst is Lithium Chloride.

10. A process for forming isocyanate prepolymers according to claim 1 wherein said isocyanate is selected from the group consisting of 4,4'-diphenylmethane diisocyanate (MDI), polymeric 4,4'diphenylmethane diisocyanate, 2,4:2, 6-toluene diisocyanate as an 80:20 mixture, 2,4:2,6-toluene diisocyanate as a 65:35 mixture, pure 2,4-toluene diisocyanate, pure 2,6-toluene diisocyanate, a TDI-based prepolymer, p-phenylene diisocyanate, 1,5-naphtalene diisocyanate, 4,6-xylylene diisocyanate, 3,3'-tolidine-4,4'-diisocyanate, 3,3'-dimethyl-diphenylmethane 4,4'-diisocyanate, 1,6-hexamethylene diisocyanate, 2,2,4-(2,4,4-) trimethylhexamethylene diisocyanate, 4,4'-dicyclohexylmethane diisocyanate, isophorone diisocynate, and cyclohexyl diisocynate.

11. A process for forming isocyanate prepolymers according to claim 1 wherein said epoxidized natural oil is derived from at least one of the group consisting of soybean oil, safflower oil, linseed oil, corn oil, sunflower oil, olive oil, canola oil, seasame oil, cottonseed oil, palm oil, rapeseed oil, tung oil, and fish oil, high oleic safflower oil, peanut oil, sunflower oil and high erucic rapeseed oil.

12. A process for forming isocyanate prepolymers as set forth in claim 1 including the additional, subsequent steps combining about 1 part polyol and about 1 part organic solvent with about 2 parts of the mixture prepared in accordance with claim 1.

* * * * *